June 28, 1960　　H. F. HICKS, JR., ET AL　　2,943,201
ANTI-COLLISION APPARATUS
Filed July 10, 1957
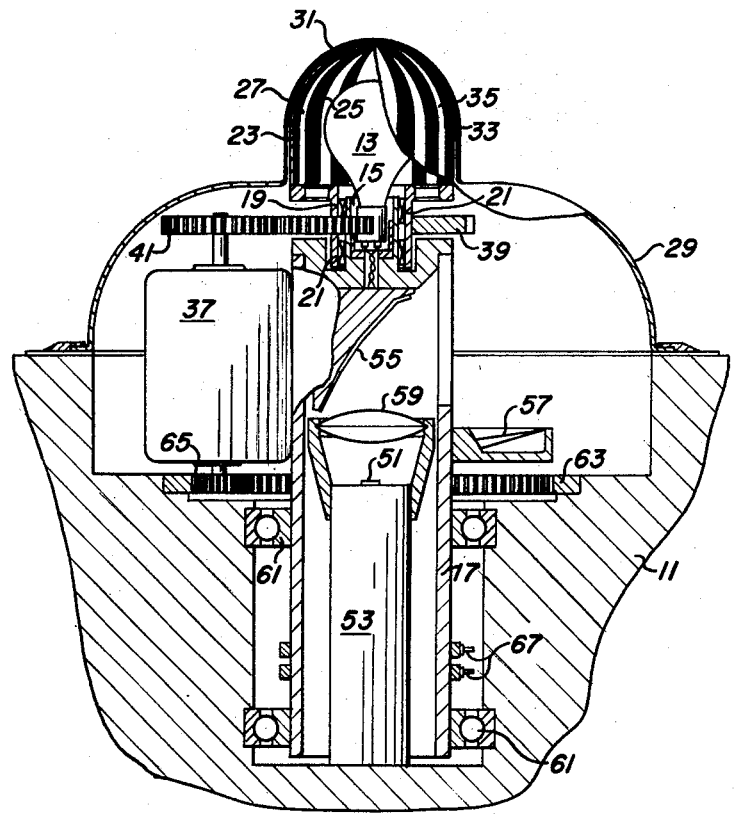
HARRY F. HICKS JR.
CARLTON J. BAXTER
INVENTORS
BY
ATTORNEYS United States Patent Office
2,943,201
Patented June 28, 1960

2,943,201

ANTI-COLLISION APPARATUS

Harry F. Hicks, Jr., and Carlton J. Baxter, Rochester, N.Y., assignors, by mesne assignments, to the United States of America as represented by the Secretary of the Navy Filed July 10, 1957, Ser. No. 671,109

2 Claims. (Cl. 250—83.3)

This invention relates to infrared anti-collision equipment and more particularly to an apparatus including a transmitter and receiver of infrared energy which can be readily installed in aircraft to provide a warning to signal the approach of other aircraft.

The utilization of an infrared energy detection system for signaling the presence of foreign craft within the field of an optical system is old and well known in the art. The infrared anti-collision apparatus of the present invention utilizes these known principles and comprises broadly an infrared transmitter and receiver constructed as a complete unit for installation in a suitable aircraft. The transmitter comprises an infrared energy emitting source, the energy of which is chopped to a known frequency and radiated into space. The receiver comprises an optical system designed to scan the field into which the radiation is emitted by the transmitter to focus infrared energy from other aircraft within that field onto an infrared sensitive device or bolometer. An electric motor drives the infrared energy chopper through a suitable gear system, and also drives through another gear system, the rotatable housing which carries the optical system for the receiver in order to cyclically scan a field with the optical system for the receiver. The signals generated by the bolometer in response to the incident infrared energy are amplified and used to provide the desired warning.

The primary object of the present invention is, therefore, to provide anti-collision apparatus comprising an infrared energy transmitter and receiver to be mounted as a unit in a known craft for signaling the approach of other craft.

Another object of the present invention is to provide anti-collision apparatus in which an electric motor is utilized to drive a chopper for the infrared energy emitted by the transmitter and to rotate the optical scanning system for the receiver portion of the apparatus.

Still other objects and advantages of the present invention will become readily apparent to those skilled in the art from the following description with reference to the drawing in which like characters denote like parts and wherein;

The single illustration is an elevation view partly in section of the anti-collision apparatus of the present invention.

In the drawing the numeral 11 designates the body of a craft on which the anti-collision apparatus is mounted. The transmitter of the anti-collision apparatus comprises an infrared energy source 13 which is mounted in a socket 15 on the upper end of the main shaft 17 coaxial therewith. A tubular shaft 19 is mounted on suitable bearings 21 for rotation with respect to socket 15 and supports the inner housing 23 which forms a dome over the source 13. The housing 23 is provided with alternating areas which reflect and transmit the infrared energy from source 13. The areas 25 reflect the infrared energy and the other areas 27 transmit the infrared energy. An infrared transmitting transparent dome 29 is mounted on body 11 and covers the anti-collision apparatus. The top portion of dome 29 is formed with an outer housing 31 having a configuration similar to but slightly larger than housing 23 to permit housing 23 to be received therein, and has areas 33 which reflect infrared energy from source 13 and other areas 35 which transmit such energy. Housing 23 is rotated with respect to the main shaft 17 and with respect to outer housing 31 by means of a motor 37 which drives gear 39 fixed on shaft 19 through gear 41. The infrared energy from source 13 is chopped to the desired frequency as a result of the rotation of housing 23 with respect to housing 31.

An infrared energy sensitive detecting element or bolometer 51 is mounted on a support 53 in the focal plane of the optical system for the receiver of the anti-collision apparatus. The support 53 is centered within the main shaft 17. The optical system comprises the field mirrors 55 and 57 and the collective lens 59. The field mirrors 55 and 57 are segmented mirrors consisting of several plain mirrors each mounted at a slightly different angle so that the image of the bolometer 51 is spread through a large angle of elevation. The size of the bolometer 51 in azimuth is maintained. Lens 59 is carried in a suitable mount provided on the end of support 53. Mirror 55 is mounted directly to the main shaft 17 at the inner upper end thereof, while mirror 57 is mounted on the exterior of main shaft 17 in a position to reflect images passing through the dome 29 to mirror 55, through lens 59 and onto bolometer 51. The main shaft 17 is rotated with respect to the body 11 about its longitudinal axis on suitable bearings 61 by means of a planetary gear train comprising the fixed gear 63 and the follower gear 65 which is mounted on the other end of the armature shaft of the motor 37. Rotation of main shaft 17 permits the field mirrors 55 and 57 to cyclically scan the field and to focus the infrared energy from a craft within that field onto the bolometer 51. Electric power to operate motor 37 is supplied by a source (not shown) through a conventional electric circuit (not shown) including the slip rings 67 and the motor 37. The infrared source 13 is also connected to the electric circuit and energized by the same power source. The bolometer 51 is connected to a suitable electric circuit comprising a conventional amplifier (not shown) and means (not shown) for actuating an alarm (not shown) indicating the detected presence of another craft in the field of the optical system of the receiver.

It will be appreciated that suitable means may be employed to permit the alarm to be actuated only in response to the incidence of infrared energy on bolometer 51 having a signal frequency equal to the signal frequency emitted by the transmitter. Thus only craft which reflect the chopped infrared energy signals from the source 13 or craft which carry similar anti-collision apparatus incorporating transmitters emitting infrared energy of the given frequency would cause the alarm to be energized.

While only one embodiment of the present invention has been illustrated and described, many modifications and variations are possible and will be readily apparent to those skilled in the art from the foregoing description which is intended, therefore, to be illustrative only and the scope of the invention is defined in the appended claims.

Having now particularly described our invention, what we desire to secure by Letters Patent of the United States and what we claim is:

1. An apparatus to be carried by a known craft for detecting the presence of a foreign craft in a predetermined field adjacent said known craft and for signaling to said foreign craft the presence of said known craft, comprising an infrared energy sensitive detecting element, an optical system including a field mirror and collective optics for focusing onto said detecting element infrared energy from said foreign craft within the field of said optical system, means for supporting said detecting element in the focal plane of said collective optics, a housing having a longitudinal axis and partially enclosing said detecting element and said collective optics, socket means provided on one end of said housing on the exterior thereof and coaxial with said longitudinal axis, said housing being mounted for rotation about said longitudinal axis in said known craft and rigidly carrying said field mirror in optical alignment with said collective optics, means for rotating said housing and said field mirror as a unit to scan a predetermined field with said field mirror, an infrared energy emitting source mounted in said socket means and without the field of said optical system, first means mounted adjacent said source for intercepting the infrared energy emitted by said source and having areas capable of transmitting infrared energy spaced by areas which reflect said energy, second means positioned between said source and said first means and having areas capable of transmitting infrared energy spaced by areas which reflect said energy, the areas of said second means being similar in size and configuration to the areas of said first means, and means actuated by said rotating means to rotate said second means with respect to said first means and thereby chop the infrared energy emitted by said source to a frequency recognizable by similar apparatus carried by said foreign craft.

2. A detecting and signaling apparatus in accordance with that defined in claim 1 and wherein said rotating means comprises an electric motor rigidly mounted on the exterior of said housing, and a planetary gear train comprising a fixed gear rigidly mounted in said known craft coaxial with said longitudinal axis and a follower gear mounted on one end of the armature shaft of said motor and drivingly engaging said fixed gear, and wherein said first means is fixed in position with respect to said known craft and said means actuated by said rotating means comprises a gear train driven from the other end of said armature shaft of said electric motor.

References Cited in the file of this patent

UNITED STATES PATENTS

| | | |
|---|---|---|
| 2,237,193 | Mobsby | Apr. 1, 1941 |
| 2,369,622 | Toulon | Feb. 13, 1945 |
| 2,392,873 | Zahl | Jan. 15, 1946 |
| 2,412,165 | McDermott | Dec. 3, 1946 |
| 2,423,885 | Hammond | July 15, 1947 |
| 2,721,275 | Jackson | Oct. 18, 1955 |